(12) United States Patent
Sugino et al.

(10) Patent No.: US 8,007,392 B2
(45) Date of Patent: Aug. 30, 2011

(54) AUTOMATIC TRANSMISSION

(75) Inventors: Soichi Sugino, Wako (JP); Yoshinori Tanaka, Wako (JP); Takuya Kurokawa, Wako (JP); Junya Tachikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 12/361,324

(22) Filed: Jan. 28, 2009

(65) Prior Publication Data
US 2009/0192002 A1 Jul. 30, 2009

(30) Foreign Application Priority Data

Jan. 29, 2008 (JP) ................................. 2008-017431

(51) Int. Cl.
*F16H 57/10* (2006.01)
(52) U.S. Cl. ......... 475/271; 475/311; 475/317; 475/330
(58) Field of Classification Search .................. 475/271, 475/282, 296, 311, 317, 330
See application file for complete search history.

(56) References Cited

U.S. PATENT DOCUMENTS

| | | | | |
|---|---|---|---|---|
| 6,120,410 A * | 9/2000 | Taniguchi et al. | ............ | 475/285 |
| 6,139,463 A * | 10/2000 | Kasuya et al. | ................ | 475/275 |
| 6,558,287 B2 * | 5/2003 | Hayabuchi et al. | ........... | 475/271 |
| 7,704,182 B2 * | 4/2010 | Kamada et al. | ................ | 475/276 |
| 2002/0142880 A1 | 10/2002 | Hayabuchi et al. | | |
| 2006/0035744 A1 | 2/2006 | Seo et al. | | |

FOREIGN PATENT DOCUMENTS

JP 2006-161867 A 6/2006

OTHER PUBLICATIONS

European Search Report dated Apr. 6, 2009, issued in corresponding European Patent Application No. 09150623.8.

* cited by examiner

*Primary Examiner* — Justin Holmes
(74) *Attorney, Agent, or Firm* — Westerman, Hattori, Daniels & Adrian, LLP

(57) ABSTRACT

A second clutch (C2) which couples a carrier (Cr) of the compound planetary gear set (6) to a speed ring gear (Rf) of the single planetary gear set (5) is arranged between the single planetary gear set (5) and the compound planetary gear set (6). Then, a first clutch (C1) which couples a second sun gear (Sr2) of the compound planetary gear set (6) to a carrier (Cf) of the single planetary gear set (5), and a third clutch (C3) which couples a sun gear (Sr1) of the compound planetary gear set (6) to carrier (Cf) of the single planetary gear set (5) are arranged at the side of the compound planetary gear set (6) opposite to the single planetary gear set (5).

2 Claims, 2 Drawing Sheets

AUTOMATIC TRANSMISSION

BACKGROUND OF THE INVENTION

1. Field of the Invention

The present invention relates to an automatic transmission which changes the speed of rotation of an input shaft among multiple speeds to transmit the rotation to an output shaft through a single planetary gear set and a compound planetary gear set, both provided between the input shaft and the output shaft.

2. Description of the Related Art

For automobile vehicle, there are known automatic transmissions in which elements of a single planetary gear set coupled to an input shaft and elements of a compound planetary gear set are coupled through plural clutches or fixed through brakes to change the speed of rotation of the input shaft and transmit the rotation to an output shaft. For example, an automatic transmission described in Japanese Patent Application Publication No. 2006-161867 changes the speed of rotation of the input shaft in a range of 6 forward speeds and 1 reverse speed to output the rotation to the output shaft. In this automatic transmission, the input shaft and the output shaft are axially supported by a transmission case, and an intermediate member is axially supported on the input shaft rotatably relative to the input shaft. One end of an intermediate shaft is fitted into and coaxially supported by the intermediate member rotatably relative thereto, and the other end of the intermediate shaft is coaxially supported by the output shaft rotatably relative thereto. The single planetary gear set includes an input element (carrier) directly connected to the input shaft, a fixed element (sun gear) fixed to the transmission case, and a speed increasing element (ring gear) which increases the speed of rotation of the input shaft. The speed increasing element is directly connected to the intermediate member. The compound planetary gear set includes a first rotating element capable of being coupled to the input element through a third clutch and being fixed through a first brake, a second rotating element capable of being coupled to the intermediate shaft through a second clutch and being fixed through a second brake, a third rotating element directly connected to the output shaft, and a fourth rotating element capable of being coupled to the input element through a first clutch.

However, in the conventional structure, since the second clutch is provided at the side of the compound planetary gear set opposite to the single planetary gear set in the axial direction, it is necessary to provide the intermediate shaft capable of coaxially rotating relative to the input shaft. The intermediate member also needs to be provided to couple the ring gear as the speed increasing element of the single planetary gear set to the intermediate shaft along the axis of the input shaft. Thus, the numbers of the torque transmitting elements arranged in the axial direction of the input shaft are increased. In this structure, when an output rotation with a relatively low rotational speed and high torque is input, especially in a diesel engine, allocated torque for each part of the automatic transmission becomes large. In this case, it is necessary to use clutches and brakes with high torque capacities, resulting in increasing the size of the automatic transmission and hence making it difficult to mount the automatic transmission on a vehicle, in other words, deteriorating the mountability thereof on a vehicle.

Further, the first to third clutches are generally designed in such a manner that a piston presses a friction plate through working oil to couple two members of the 3 clutches. Therefore, a structure can be considered, in which a piston chamber of the first clutch is provided on the fourth rotating element side to make the allocated torque small so that clutches and brakes with low torque capacities can be used. In this structure, however, since the fourth rotating element rotates fast at the sixth gear speed, excessive centrifugal pressure occurs in the piston chamber, which is possible to impede the smooth action of the first clutch.

SUMMARY OF THE INVENTION

The present invention has been made in view of the above circumstances, and it is an object thereof to provide an automatic transmission capable of reducing allocated torque for each part thereof and reducing the number of torque transmitting elements while preventing clutches from rotating at high speed in vain to realize a compact structure.

In order to attain the above object, according to the present invention, there is provided an automatic transmission, which changes the speed of rotation of an input shaft among multiple speeds to transmit the rotation to an output shaft through a single planetary gear set and a compound planetary gear set, both arranged in a transmission case. The single planetary gear set includes an input element coupled to the input shaft, a fixed element fixed to the transmission case, and a speed increasing element which increases the speed of rotation of the input shaft to transmit the rotation to the compound planetary gear set. The compound planetary gear set includes four rotating elements composed of a combination of plural planetary gears, wherein the four rotating elements included in the compound planetary gear set are set as a first rotating element, a second rotating element, a third rotating element, and a fourth rotating element, respectively, in order of arrangement at spaces corresponding to gear ratios in a velocity diagram, with the third rotating element coupled to the output shaft. The automatic transmission further includes a first clutch which couples the fourth rotating element to the input element in a releasable manner, a second clutch which couples the second rotating element to the speed increasing element in a releasable manner, a third clutch which couples the first rotating element to the input element in a releasable manner, a first brake which fixes the first rotating element to the transmission case in a releasable manner, and a second brake which fixes the second rotating element to the transmission case in a releasable manner, wherein the second clutch is arranged between the single planetary gear set and the compound planetary gear set, and the first clutch and the third clutch are arranged at the side of the compound planetary gear set opposite to the single planetary gear set in an axial direction of the input shaft.

Further, in another aspect of the present invention, it is preferable that the second clutch should include a piston chamber which operates a friction plate to couple two elements, and the piston chamber of the second clutch should be provided in a manner linked with the speed increasing element of the single planetary gear set.

According to the automatic transmission of the present invention, as apparent from a preferred embodiment to be described later, since the second clutch is arranged between the speed increasing element of the single planetary gear set and the second rotating element of the compound planetary gear set, the intermediate member and the intermediate shaft in the conventional structure do not need providing, and this makes it possible to minimize the allocated torque for each element. Further, not only can the piston chamber of the second clutch be provided on the speed increasing element side, but also the third clutch is arranged at the side of the compound planetary gear set opposite to the single planetary gear set in the axial direction of the input shaft, so that a piston chamber of the third clutch can be provided on the first rotating element side, and this makes it possible to reduce the allocated torque for each element. In addition, since the first clutch is also provided at the side of the compound planetary gear set opposite to the single planetary gear set in the axial direction of the input shaft, a piston chamber of the first clutch can be provided on the input element side of the single planetary gear set, and this makes it possible to prevent the piston chamber of the first clutch from rotating at high speed in vain.

Thus, according to the present invention, the allocated torque for each element can be reduced, and the number of torque transmitting elements can be reduced while preventing the clutches from rotating at high speed in vain, so that a compact automatic transmission can be obtained.

DESCRIPTION OF THE PREFERRED EMBODIMENT

Figure 1:
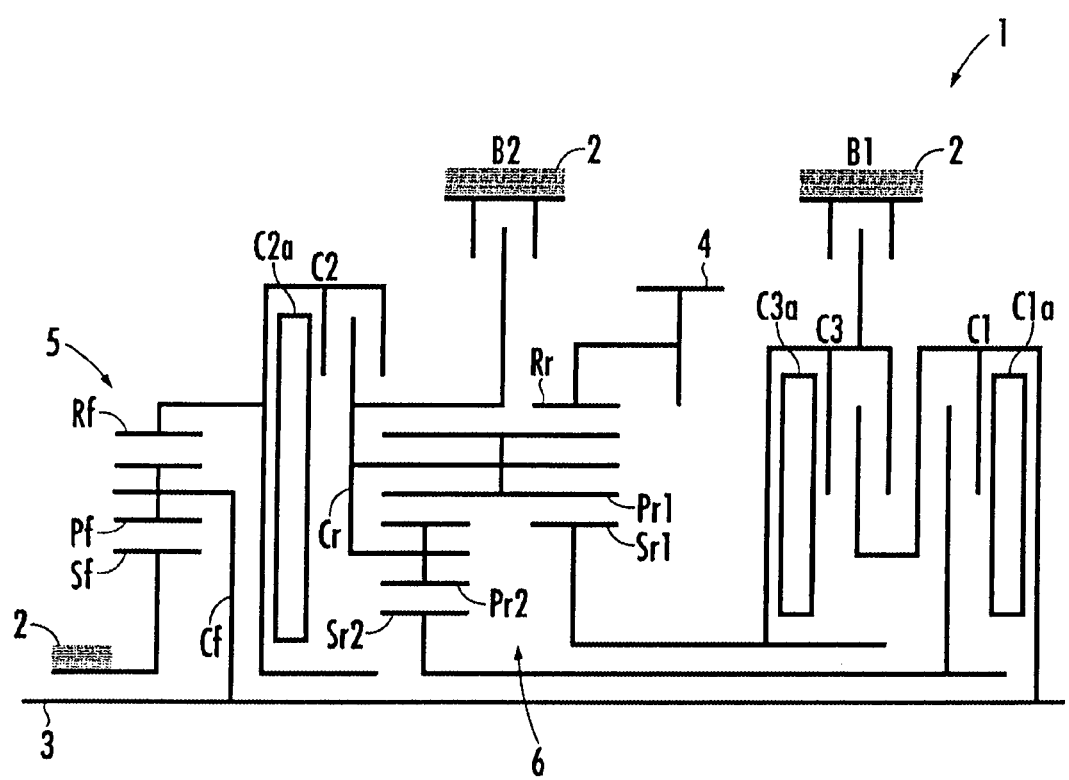
FIG. 1 is a skeleton diagram schematically showing an automatic transmission according to a preferred embodiment of the present invention.
Figure 2:
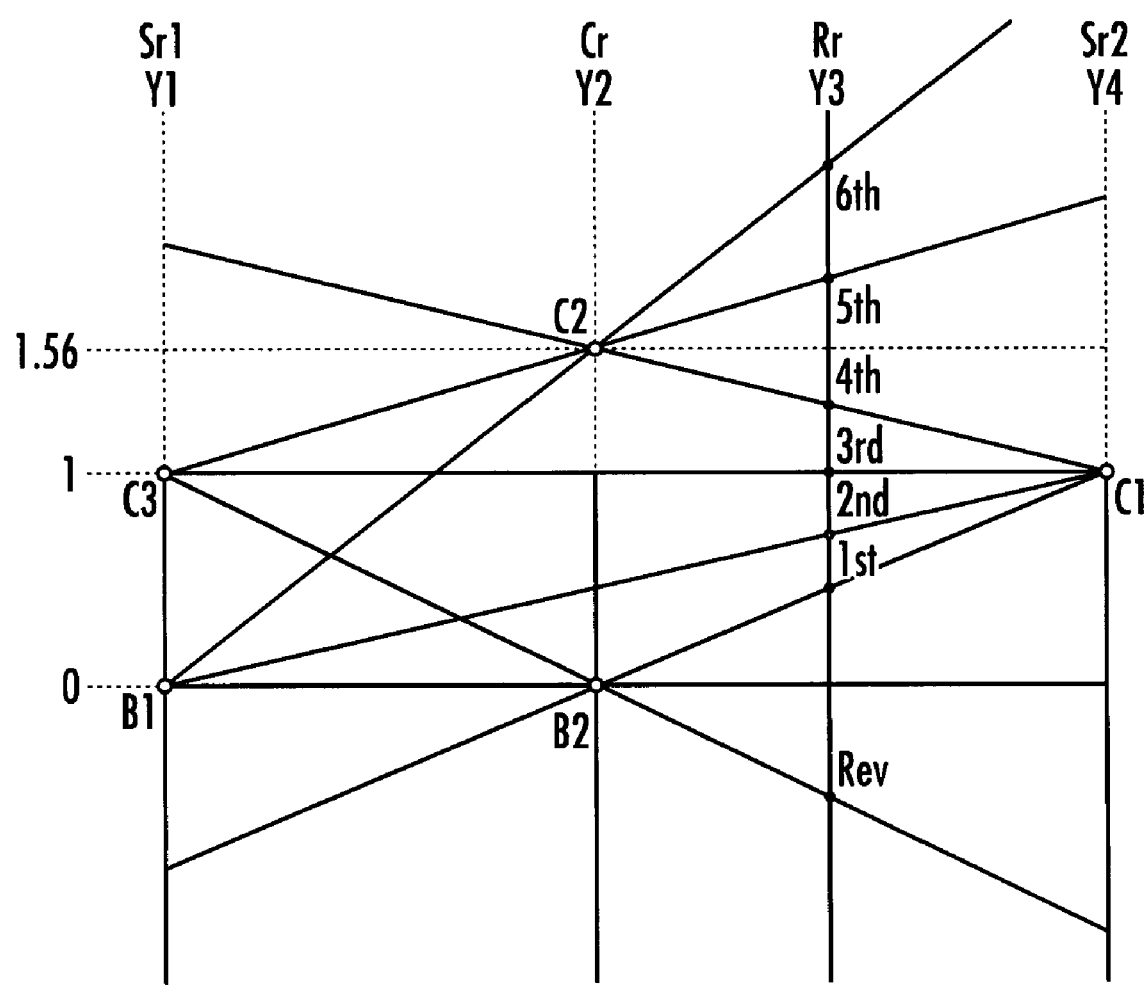
FIG. 2 is a velocity diagram of a compound planetary gear set in the automatic transmission according the preferred embodiment of the present invention.

A preferred embodiment of the present invention will now be described with reference to the accompanying drawings. FIG. 1 is a skeleton diagram schematically showing an automatic transmission according to the embodiment of the present invention. FIG. 2 is a velocity diagram of a compound planetary gear set in the automatic transmission according to the embodiment of the present invention.

As shown in FIG. 1, an automatic transmission 1 of the embodiment includes an input shaft 3 axially supported inside a transmission case 2 so that it is rotatable therein, and an output gear 4 arranged coaxially with the input shaft 3. The rotation of the output gear 4 is transmitted to right and left drive wheels of a vehicle through an output shaft and a differential gear (not shown). The input shaft 3 is a turbine shaft of a torque converter (not shown), which is rotated by a power source such as an engine. It should be noted that the automatic transmission 1 is approximately symmetrical about its center line and the lower half part below the center line is omitted in FIG. 1.

A single planetary gear set 5 for power input and a compound planetary gear set 6 for gear shifting are arranged in the transmission case 2. The single planetary gear set 5 consists of a sun gear Sf, a pinion Pf which is brought into meshed engagement with the sun gear Sf, a ring gear Rf which is brought into meshed engagement with the pinion Pf, and a carrier Cf which supports the pinion Pf rotatably and revolvably. In the embodiment, the carrier Cf is an input element coupled to the input shaft 3, the sun gear Sf is a fixed element fixed to the transmission case, and the ring gear Rf is a speed increasing element which increases the speed of rotation of the input shaft 3 and outputs the rotation.

The compound planetary gear set 6 consists of a first sun gear Sr1, a second sun gear Sr2, a ring gear Rr, a first pinion Pr1 which is brought into meshed engagement with the first sun gear Sr1 and the ring gear Rr, a second pinion Pr2 which is brought into meshed engagement with the second sun gear Sr2 and the first pinion Pr1, and a carrier Cr which supports the first pinion Pr1 and the second pinion Pr2 rotatably and revolvably.

FIG. 2 is a velocity diagram in which the rotational speeds of the four rotating elements equipped in the compound planetary gear set 6 can be represented as straight lines. In FIG. 2, the bottommost horizontal line indicates a rotational speed of "0", the horizontal line right thereabove indicates a rotational speed of "1", and the topmost horizontal line indicates a rotational speed of "1.56" obtained from the ring gear Rf (speed increasing element) of the single planetary gear set 5 of the embodiment. Four vertical lines Y1, Y2, Y3, and Y4 are defined according to the gear ratios of the compound planetary gear set 6 to indicate a first rotating element, a second rotating element, a third rotating element, and a fourth rotating element in order from the left. Here, the first rotating element corresponds to the first sun gear Sr1, the second rotating element corresponds to the carrier Cr, the third rotating element corresponds to the ring gear Rr, and the fourth rotating element corresponds to the second sun gear Sr2.

In the embodiment, the ring gear Rr (third rotating element) of the compound planetary gear set 6 is coupled to an output shaft (not shown) through the output gear 4. Further included in the automatic transmission 1 are a first clutch C1 which couples the second sun gear Sr2 (fourth rotating element) of the compound planetary gear set 6 to the carrier Cf (input element) of the single planetary gear set 5 in a releasable or uncouplable manner, a second clutch C2 which couples the carrier Cr (second rotating element) of the compound planetary gear set 6 to the ring gear Rf (speed increasing element) of the single planetary gear set 5 in a releasable manner, a third clutch C3 which couples the first sun gear Sr1 (first rotating element) of the compound planetary gear set 6 to the carrier Cf (input element) of the single planetary gear set S in a releasable manner, a first brake B1 which fixes the first sun gear Sr1 (first rotating element) of the compound planetary gear set 6 to the transmission case 2 in a releasable or unfixable manner, and a second brake B2 which fixes the carrier Cr (second rotating element) of the compound planetary gear set 6 to the transmission case 2 in a releasable manner.

As shown in FIG. 1, the second clutch C2 is arranged between the single planetary gear set 5 and the compound planetary gear set 6, and the first clutch C1 and the third clutch C3 are arranged at the side of the compound planetary gear set 6 opposite to the single planetary gear set 5 in the axial direction of the input shaft 3. Further, in the embodiment, a piston chamber C2a of the second clutch C2 is provided in a manner linked with the ring gear Rf (speed increasing element) of the single planetary gear set 5, and a piston chamber C3a of the third clutch C3 is provided in a manner linked with the first sun gear Sr1 (first rotating element) of the compound planetary gear set 6. A piston chamber C1a of the first clutch C1 is provided on the carrier Cf (input element) side of the single planetary gear set 5. Though not shown in detail, each of the clutches C1, C2, and C3 is to operate a friction plate by means of working oil in each of the piston chambers C1a, C2a, and C3a in order to couple two elements, respectively.

As apparent from the velocity diagram of FIG. 2, when the second sun gear Sr2 (fourth rotating element) of the compound planetary gear set 6 and the carrier Cf (input element) of the single planetary gear set 5 are coupled by the first clutch C1, and the carrier Cr (second rotating element) of the compound planetary gear set 6 is fixed by the second brake B2 to the transmission case 2, the rotational speed of the ring gear Rr (third rotating element) of the compound planetary gear set 6 becomes "1st", thus establishing a first gear speed.

When the second sun gear Sr2 (fourth rotating element) of the compound planetary gear set 6 and the carrier Cf (input element) of the single planetary gear set 5 are coupled by the first clutch C1, and the first sun gear Sr1 (first rotating element) of the compound planetary gear set 6 is fixed by the first brake B1 to the transmission case 2, the rotational speed of the ring gear Rr (third rotating element) of the compound planetary gear set 6 becomes "2nd", thus establishing a second gear speed with a gear ratio smaller than that of the first gear speed.

When the second sun gear Sr2 (fourth rotating element) of the compound planetary gear set 6 and the carrier Cf (input element) of the single planetary gear set 5 are coupled by the first clutch C1, and the first sun gear Sr1 (first rotating element) of the compound planetary gear set 6 and carrier Cf (input element) of the single planetary gear set 5 are coupled by the third clutch C3, the rotational speed of the ring gear Rr (third rotating element) of the compound planetary gear set 6 becomes "3rd", matching the rotational speed "0" of the bottommost horizontal line. Thus, a third gear speed with a gear ratio smaller than that of the second gear speed is established.

When the second sun gear Sr2 (fourth rotating element) of the compound planetary gear set 6 and the carrier Cf (input element) of the single planetary gear set 5 are coupled by the first clutch C1, and the carrier Cr (second rotating element) of the compound planetary gear set 6 and the ring gear Rf (speed increasing element) of the single planetary gear set 5 are coupled by the second clutch C2, the rotational speed of the ring gear Rr (third rotating element) of the compound planetary gear set 6 becomes "4th", thus establishing a fourth gear speed with a gear ratio smaller than that of the third gear speed.

When the carrier Cr (second rotating element) of the compound planetary gear set 6 and the ring gear Rf (speed increasing element) of the single planetary gear set 5 are coupled by the second clutch C2, and the first sun gear Sr1 (first rotating element) of the compound planetary gear set 6 and the carrier Cf (input element) of the single planetary gear set 5 are coupled by the third clutch C3, the rotational speed of the ring gear Rr (third rotating element) of the compound planetary gear set 6 becomes "5th", thus establishing a fifth gear speed with a gear ratio smaller than that of the fourth gear speed.

When the carrier Cr (second rotating element) of the compound planetary gear set 6 and the ring gear Rf (speed increasing element) of the single planetary gear set 5 are coupled by the second clutch C2, and the first sun gear Sr1 (first rotating element) of the compound planetary gear set 6 is fixed by the first brake B1 to the transmission case 2, the rotational speed of the ring gear Rr (third rotating element) of the compound planetary gear set 6 becomes "6th", thus establishing a sixth gear speed with a gear ratio smaller than that of the fifth gear speed.

When the first sun gear Sr1 (first rotating element) of the compound planetary gear set 6 and the carrier Cf (input element) of the single planetary gear set 5 are coupled by the third clutch C3, and the carrier Cr (second rotating element) of the compound planetary gear set 6 is fixed by the second brake B2 to the transmission case 2, the rotational speed of the ring gear Rr (third rotating element) of the compound planetary gear set 6 becomes "Rev", reversing the rotation. Thus, a reverse gear speed is established.

As shown in FIG. 1, in the automatic transmission 1 of the embodiment thus operating in the above manner, since the second clutch C2 is arranged between the ring gear Rf (speed increasing element) of the single planetary gear set 5 and the carrier Cr (second rotating element) of the compound planetary gear set 6, the intermediate member and the intermediate shaft in the conventional structure do not need providing, and this makes it possible to minimize the allocated torque for each element.

Further, since not only the second piston chamber C2a of the clutch C2 can be provided in a manner linked with the ring gear Rf (speed increasing element) of the single planetary gear set 5, but also the third clutch C3 is arranged at the side of the compound planetary gear set 6 opposite to the single planetary gear set 5 in the axial direction of the input shaft 3, the piston chamber C3a of the third clutch C3 can be provided in a manner linked with the first sun gear Sr1 (first rotating element) of the compound planetary gear set 6, and this also makes it possible to reduce the allocated torque for each element. Therefore, even when an output rotation with a relatively low rotational speed and high torque is input like in a diesel engine, since the allocated torque for each part of the automatic transmission 1 is small and there is no need to increase the capacity of each of the clutches C1, C2, C3, or the brakes B1, B2, the automatic transmission 1 can be made compact, thereby improving mountability.

Further, since the first clutch C1 is also arranged at the side of the compound planetary gear set 6 opposite to the single planetary gear set 5 in axial directions of the input shaft 3, the piston chamber C1a of the first clutch C1 can be provided on the carrier Cf (input element) side of the single planetary gear set 5. As a result, the piston chamber C1a of the first clutch C1 can be made separate from the second sun gear Sr2 (fourth rotating element) of the compound planetary gear set 6 that rotates at high speed when the rotational speed of the ring gear Rr (third rotating element) of the compound planetary gear set is "6th", excessive centrifugal pressure does not occur in the piston chamber C1a of the first clutch C1.

What is claimed is:

1. An automatic transmission which changes the speed of rotation of an input shaft among multiple speeds to transmit the rotation to an output shaft through a single planetary gear set and a compound planetary gear set, both provided in a transmission case, the single planetary gear set comprising:
a planet carrier coupled to the input shaft;
a sun gear fixed to the transmission case; and
a ring gear, the compound planetary gear set comprising:
a first sun gear;
a second sun gear;
a second ring gear;
a first pinion gear which is brought into meshed engagement with the first sun gear and the second ring gear;
a second pinion which is brought into meshed engagement with the second sun pinion and the first pinion gear; and
a carrier which supports the first pinion gear and the second pinion gear rotatably and revolvably, and the automatic transmission further comprising:
a second brake which fixes the carrier to the transmission case in a releasable manner;

a first clutch which couples the second sun gear to the input shaft in a releasable manner;

a second clutch which couples the carrier to the ring gear of the planetary gear set in a releasable manner a third clutch which couples the first sun gear to the input shaft in a releasable manner; and a first brake which fixes the first sun gear to the transmission case in a releasable manner, wherein the second clutch is arranged between the single planetary gear set and the compound planetary gear set, and wherein the first clutch and the third clutch are arranged at the side of the compound planetary gear set opposite to the single planetary gear set in an axial direction of the input shaft.

2. The automatic transmission according to claim 1, wherein the second clutch includes a piston chamber which operates a friction plate to couple two elements, and the piston chamber of the second clutch is provided in a manner linked with the ring gear of the single planetary gear set.

\* \* \* \* \*